Figure 1:
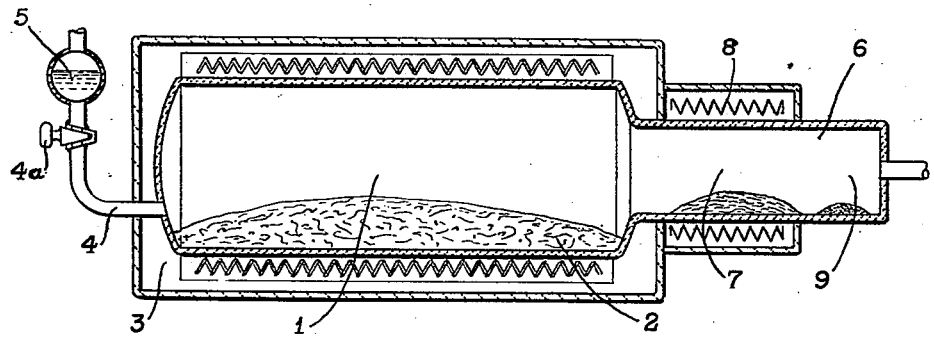

Oct. 9, 1956  H. SCHÄFER  2,766,112
PRODUCTION OF METALLIC TANTALUM AND METALLIC NIOBIUM FROM
MIXTURES OF COMPOUNDS THEREOF
Filed Nov. 29, 1952

INVENTOR.
Harald Schafer
BY Klein & Hart
his attorneys

United States Patent Office 2,766,112
Patented Oct. 9, 1956

2,766,112

PRODUCTION OF METALLIC TANTALUM AND METALLIC NIOBIUM FROM MIXTURES OF COMPOUNDS THEREOF

Harald Schäfer, Stuttgart, Germany, assignor to W. C. Heraeus G. m. b. H., Platinschmelze, Hanau (Main), Germany, a corporation of Germany Application November 29, 1952, Serial No. 323,192

Claims priority, application Germany November 17, 1952

9 Claims. (Cl. 75—84.5)

The present invention has for an object the production, in a single operation, of comparatively pure tantalum or pure niobium from a starting mixture of compounds of tantalum and niobium and to considerably increase the percentage of the other elements in the residual components. According to the present invention mixtures containing oxides or hydrated oxides of the elements niobium and tantalum are treated to produce a modified mixture in which said elements are present in the form of pentachlorides. This chloride mixture is then, at an increased temperature and in a flow of hydrogen, largely separated, the tantalum chloride being simultaneously reduced to the metal.

Niobium pentachloride is more readily reduced to lower chlorides than is tantalum pentachloride, and the lower chlorides of niobium are considerably less volatile than tantalum pentachloride. Therefore it is possible for the lower chlorides of niobium to be separated from tantalum pentachloride by fractionated sublimation. According to the present invention this separation is carried out with the reduction of tantalum pentachloride to tantalum or tantalum hydride. It has been found that reduction of tantalum pentachloride, known to be capable of reduction with hydrogen at higher temperatures, can also be effected with a mixture of hydrogen and hydrogenchloride by the separation of the chloride of niobium and tantalum. This invention forms the basis for the separation of the compounds of the two elements and the production of metallic tantalum in a single operation, thus avoiding decomposition of tantalum pentachloride, which rapidly occurs by hydrolysis in the presence of air.

Starting materials for carrying out the method of this invention are technically mixtures normally available which have a content of oxides or hydrated oxides of niobium and tantalum, or natural products, which generally contain the two elements in the form of their oxides.

The transformation into chlorides may be carried out in a simple manner by known chlorinating agents such for example as phosphor-pentachloride, phosgene, disulphurdichloride, thionylchloride and chlorinated hydrocarbons such as carbon tetrachloride and octachloropropane. If the more economical chlorination in a flow process is preferred to the chlorination in a bomb tube, substances such as carbon tetrachloride, more particularly thionyl chloride, have been found particularly suitable.

Figure 2:
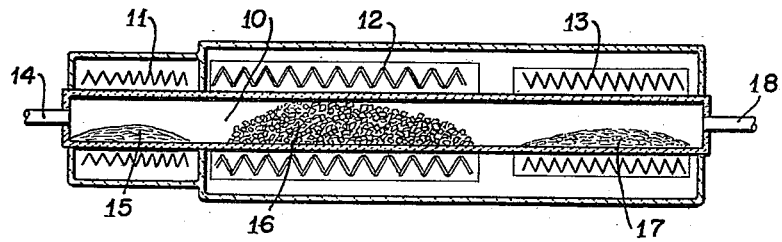
Figure 3:
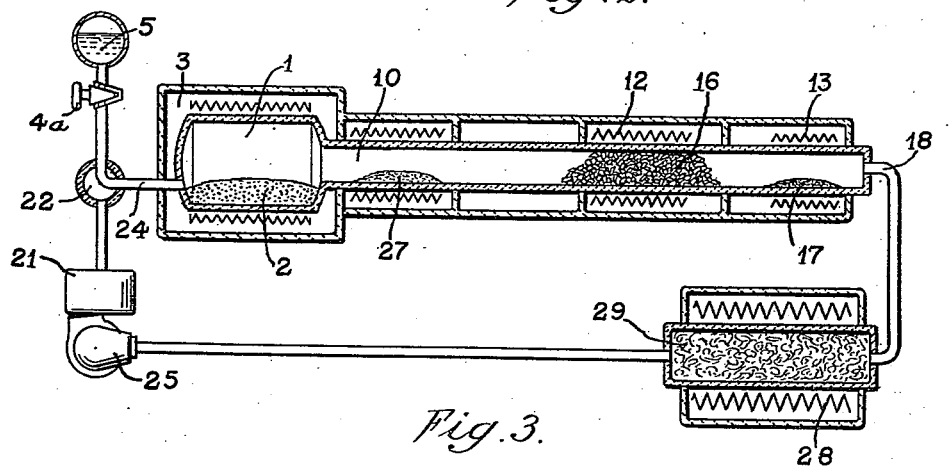

The invention is described, by way of example, by reference to the accompanying drawing in which:

Fig. 1 is a somewhat diagrammatical section through one form of chlorinating and purifying apparatus, Fig. 2 is a similar section, of a reducing and separating apparatus, and Fig. 3 is a section of a combined form of apparatus.

Referring to Fig. 1, the apparatus comprises a quartz vessel 1, in the form of a horizontal cylinder of large cross-section having a capacity of approximately 15 litres. Into this vessel 10 kilograms of a mixture 2 containing oxides of niobium and tantalum are introduced. A heating means 3 is provided, illustrated as an electric furnace. After the vessel 1 with its content has been heated, by means of such furnace or its equivalent, to a temperature of 300–350° C., thionyl chloride is introduced drop by drop from a reservoir, by means of a narrow quartz tube 4 provided with a control device 4a. In this manner about 3–4 kilograms of chlorides of niobium and tantalum are obtained within twenty-four hours. A stud extension 6 in the form of a tube of large cross-section is connected to the quartz vessel, at the end opposite to the point of introduction of the thionylchloride. The extension 6 forms a condensation chamber, in which the chlorides sublimate into the flow of the sulphur dioxide formed by the transformation and of any nitrogen which may be additionally supplied as carrier gas.

During the chlorination, pentachlorides of niobium and tantalum are formed as well as chlorides of elements whose compounds are normally present as impurities in the raw material, more particularly chlorides of the elements titanium, tin, iron and manganese. During chlorination the temperatures in the chlorination vessel, for example in the quartz vessel 1, and the condensation temperature for the chlorides of niobium and tantalum, for example the temperature of the chamber 6, may be so adjusted that the chlorides of the companion elements are largely separated from the chlorides of niobium and tantalum. In the above-mentioned example, in which the chlorination chamber 1 is heated to a temperature of 300–350° C., the less volatile chlorides of elements such as iron and manganese substantially remain in the chlorination chamber. In the condensation chamber 6 it is possible by moderate heating to remove the more volatile chlorides of tin and titanium, the boiling points of which are more than 100° lower than those of the pentachlorides of niobium and tantalum. With this object in view the part 7 of the condensation tube, which constitutes approximately one half of the tube and is located nearest to the chlorination chamber, is heated by furnace 8 to 100–150° C., more particularly to 120–130° C., whereby, in such part of the tube, substantially only the chlorides of niobium and tantalum are condensed, the more volatile chlorides of tin and titanium being precipitated in the part 9 of the tube which is kept at a lower temperature. The required temperatures in the condensation chamber may, for example, be obtained by introducing an electric furnace into the tube or by means of heating elements wound directly upon the condensation tube.

The production of the mixture of the pentachlorides of niobium and tantalum is followed by the reduction of these pentachlorides with hydrogen in a single operation. Such operation results in the separation of the two related elements and the production of pure tantalum hydride powder. This unitary operation is of great technical importance because of the very rapid decomposition of tantalum pentachloride by hydrolysis when in contact with air.

In order to attain this reduction and separation, the chlorides are first heated in a flow of hydrogen to temperatures above 120° C. and more particularly of 120–300° C., for example 180–220° C., the hydrogen carrying with it quantities of the chlorides corresponding to the vapour pressure. These, together with the hydrogen, reach a zone heated to 400–800° C., more particularly to 550–600° C., in which the niobium pentachloride is reduced to lower chlorides, preferably to niobium trichloride and also niobium tetrachloride, and precipitated within said zone. The tantalum pentachloride, which is less readily reduced, passes unchanged through this zone and is directly conveyed by the flow of the gas mixture of hydrogen and hydrogen chloride, formed by the reduction of the niobium pentachloride, into a further zone, heated to 1000–1300° C. and preferably to 1150–1200° C. The tantalum pentachloride is reduced in the last mentioned zone to tantalum or tantalum hydride. The rate (speed) of reduction may be continuously checked and controlled by analysis of the hydrogen-hydrogen chloride mixture. It was found that tantalum chloride is reduced to tantalum even when 30–40% of the outgoing (exhaust) gases were hydrogen chloride.

For carrying out the latter part of the process, a tubular reaction chamber is preferably employed, one embodiment of which is schematically illustrated in Fig. 2 by way of an explanatory example. It should be understood that the method of the invention is not limited to this embodiment.

The mixture of chlorides obtained by the first part of my process is introduced into one end of a ceramic tube 10 having a length of approximately 3 m., in which different longitudinally adjacent zones of this tube are heated to different temperatures, for example by surrounding the tube with suitable heating windings 11, 12, and 13. In a predetermined zone it is possible by uniformly reducing the spacing of the turns of the heating conductor to obtain a uniformly rising temperature zone. Well-dried hydrogen is introduced into the end 14 of the tube and passed over the heated chlorides 15, for example to 180–200° C. The hydrogen, according to the temperature which continuously rises within the zone, conveys quantities of chlorides, corresponding to the vapour pressure, into the various reaction zones. The mixture, conveyed by the hydrogen flow, first reaches a zone 16, heated to 550–600° C., in the middle of the tube and then reaches a zone 17 at the other end of the tube, which is heated to 1150–1200° C. By careful supervision of the sublimation temperatures it is possible for the chloride flow, loaded with hydrogen, to be accurately regulated. If Raschig rings are placed in the first reaction zone 16, in order to increase the contact areas and improve the turbulent mixing of the flow of gas, the chloride mixture, which contains up to approximately 30–50% of niobium pentachloride, is freed, in this zone, of its niobium content quantatively or nearly quantatively by precipitation of the lower chlorides of niobium, and more particularly of the niobium trichloride. Chlorides of other metals, which may be present in smaller quantities besides the chlorides of tantalum and niobium, are likewise reduced and precipitated in this zone. The unreduced tantalum pentachloride, together with the mixture of hydrogen and hydrogen chloride, flows into the 1200° zone 17 and is there reduced to tantalum, which is deposited in the form of layers of remarkable purity, on the walls of the tube. The rate (speed) of reaction may be increased at this point, by providing in this zone extremely thin tantalum foils as contact surfaces.

Due to its absorption of hydrogen, the tantalum is very brittle and can readily be removed from the tube and pulverised. The mixture of hydrogen and hydrogen chloride escapes from the end of the tube 18. The hydrogen not used up in the reaction may, however, be circulated by the following method.

The exhaust gases, which consist of hydrogen and hydrogen chloride, are conducted over heated aluminium, magnesium or other strongly reducing metal, whereby the hydrogen chloride is retransformed into hydrogen with the formation of chlorides of the said metals. The hydrogen thus obtained is of excellent dryness and may always be returned without loss to the initial mixture of the chlorides.

The niobium trichloride obtained in the separation may very readily be transformed into metallic niobium. For this purpose it may either be reduced directly at a suitably high temperature, which lies between 800 and 1300° C., for example, at 1,000 to 1,200° C., to metallic niobium, or it may be decomposed at higher temperatures, which lie between 800° C. and 2,000° C., for example, at 1,100 to 1,300° C., into niobium and niobium pentachloride in the presence of inert gases or in a vacuum. For carrying out these reactions, the niobium trichloride may, if desired, be retained in the reaction tube. After the separation and production of tantalum, as described with reference to Figure 2, the central zone is, in the former case, heated directly by a flow of hydrogen to the required temperature, and in the latter case, it is heated, to the required temperature, after the introduction of an inert gas.

According to a further feature of the invention the chlorination of the oxide mixture, the separation of the chlorides of niobium and tantalum, and the reduction of tantalum chloride to tantalum or to tantalum hydride may be carried out in a single tube, constituting practically a rearrangement represented by Figures 1 and 2. In this rearrangement, shown in Fig. 3, the mixture 2 of oxides of niobium and tantalum positioned at one end of the tube 10 is, for example, converted by thionyl-chloride into a mixture of pentachlorides 27, precipitated somewhat further towards the interior of the tube. After completion of the chlorination, dried hydrogen is now passed, from a source 21, through a three-way cock 22 into the tube 10. This arrangement is used instead of the chlorinating agent from reservoir 5 and a carrier gas, such as nitrogen. The hydrogen carries along the chlorides, according to the applied heating measures and chemical phenomena discussed above with reference to Figure 2, and brings the chlorides into reaction whereby niobium and tantalum are separated and metallic tantalum is simultaneously obtained in a similar manner as above described with reference to Fig. 2. This manner of operation offers, in view of the moisture sensitivity of the pentachlorides, further advantages as compared with the two-step process.

Fig. 3 shows means for recirculating hydrogen from the outgoing gas, including a heated section 28 filled with a quantity of aluminum or magnesium 29, by which hydrogen chloride is reduced to hydrogen. A circulating pump 25 finally returns the hydrogen to the source 21.

I claim:

1. In a process of producing a tantalum material selected from the group consisting of metallic tantalum and tantalum hydride, the steps which comprise passing a mixture containing tantalum pentachloride and niobium pentachloride in a flow of dry hydrogen at a temperature between about 400° C. and about 800° C. through a first reduction zone to reduce niobium pentachloride to a lower niobium chloride and to precipitate such lower niobium chloride, and subsequently passing the resulting gaseous mixture of unreduced tantalum pentachloride, hydrogen, and hydrogen chloride at a temperature between about 1000° C. and about 1300° C. directly through a second reduction zone to reduce the tantalum pentachloride to a tantalum material selected from the group consisting of metallic tantalum and tantalum hydride and to precipitate such tantalum material.

2. In a process of producing a tantalum material selected from the group consisting of metallic tantalum and tantalum hydride, the steps which comprise passing a mixture containing tantalum pentachloride and niobium pentachloride in a flow of dry hydrogen at a temperature between about 550° C. and about 600° C. through a first reduction zone to reduce niobium pentachloride to a lower niobium chloride and to precipitate such lower niobium chloride, and subsequently passing the resulting gaseous mixture of unreduced tantalum pentachloride, hydrogen, and hydrogen chloride at a temperature between about 1150° C. and about 1200° C. directly through a second reduction zone to reduce the tantalum pentachloride to a tantalum material selected from the group consisting of metallic tantalum and tantalum hydride and to precipitate such tantalum material.

3. In a process of producing a tantalum material selected from the group consisting of metallic tantalum and tantalum hydride, the steps which comprise heating a mixture containing tantalum compounds and niobium compounds to chlorinating temperature, gradually adding a chlorinating agent selected from the group consisting of thionylchloride, phosphorus pentachloride, phosgene, disulfur dichloride, and chlorinated hydrocarbons to said mixture at said chlorinating temperature, passing the resulting vapors of niobium pentachloride and tantalum pentachloride in a flow of dry hydrogen at a temperature between about 400° C. and about 800° C. through a first reduction zone to reduce niobium pentachloride to a lower niobium chloride, and to precipitate such lower niobium chloride, and subsequently passing the resulting gaseous mixture of unreduced tantalum pentachloride, hydrogen, and hydrogen chloride at a temperature between about 1000° C. and about 1300° C. directly through a second reduction zone to reduce the tantalum pentachloride to a tantalum material selected from the group consisting of metallic tantalum and tantalum hydride and to precipitate such tantalum material.

4. In a process of producing a tantalum material selected from the group consisting of metallic tantalum and tantalum hydride, the steps which comprise heating a mixture containing compounds selected from the group consisting of oxides and hydrated oxides of tantalum and niobium to a temperature between about 300° C. and about 350° C., gradually adding a chlorinating agent selected from the group consisting of thionyl chloride, phosphorus pentachloride, phosgene, disulfur dichloride, and chlorinated hydrocarbons to said mixture, passing the resulting vapors of chlorination products through a condensing zone heated to a temperature between about 100° C. and about 150° C. to condense a mixture of tantalum pentachloride and niobium pentachloride, heating said mixture of tantalum pentachloride and niobium pentachloride to a temperature between about 120° C. and about 300° C. in a flow of dry hydrogen so as to cause said hydrogen to carry along part of said mixture in vapor form, passing the resulting mixture of tantalum pentachloride, niobium pentachloride, and dry hydrogen at a temperature between about 400° C. and about 800° C. through a first reduction zone to reduce niobium pentachloride to a lower niobium chloride and to precipitate such lower niobium chloride, directly thereafter passing the resulting gaseous mixture of unreduced tantalum pentachloride, dry hydrogen, and hydrogen chloride at a temperature between about 1000° C. and about 1300° C. through a second reduction zone to reduce tantalum pentachloride to a tantalum material selected from the group consisting of metallic tantalum and tantalum hydride and to precipitate such tantalum material, conducting the resulting spent gaseous mixture of hydrogen and hydrogen chloride over a strongly reducing metal, and recirculating the dry hydrogen obtained by decomposition of hydrogen chloride by such metal, to the mixture of tantalum pentachloride and niobium pentachloride to be separated and reduced.

5. In a process of producing metallic niobium, the steps which comprise passing a mixture containing tantalum pentachloride and niobium pentachloride in a flow of dry hydrogen at a temperature between about 400° C. and about 800° C. through a reduction zone to reduce niobium pentachloride to niobium trichloride and to precipitate such niobium trichloride, and heating the precipitated niobium trichloride in a flow of hydrogen to a temperature between about 800° C. and about 1300° C. to reduce such niobium trichloride to metallic niobium.

6. In a process of producing metallic niobium, the steps which comprise passing a mixture containing tantalum pentachloride and niobium pentachloride in a flow of dry hydrogen at a temperature between about 400° C. and about 800° C. through a reduction zone to reduce niobium pentachloride to niobium trichloride and to precipitate such niobium trichloride, and heating the precipitated niobium trichloride in an inert gas atmosphere to a temperature between about 800° C. and about 2000° C. to decompose said niobium trichloride to metallic niobium and niobium pentachloride.

7. In a process of producing metallic niobium, the steps which comprise passing a mixture containing tantalum pentachloride and niobium pentachloride in a flow of dry hydrogen at a temperature between about 400° C. and about 800° C. through a reduction zone to reduce niobium pentachloride to niobium trichloride and to precipitate such niobium trichloride, and heating the precipitated niobium trichloride in a vacuum to a temperature between about 800° C. and about 2000° C. to decompose said niobium trichloride to metallic niobium and niobium pentachloride.

8. In a process of producing a tantalum material selected from the group consisting of metallic tantalum and tantalum hydride, the steps which comprise heating a mixture containing tantalum compounds and niobium compounds to chlorinating temperature, gradually adding thionylchloride to said mixture at said chlorinating temperature, passing the resulting vapors of niobium pentachloride and tantalum pentachloride in a flow of dry hydrogen at a temperature betwen about 400° C. and about 800° C. through a first reduction zone to reduce niobium pentachloride to a lower niobium chloride and to precipitate such lower niobium chloride, and subsequently passing the resulting gaseous mixture of unreduced tantalum pentachloride, hydrogen, and hydrogen chloride at a temperature between about 1000° C. and about 1300° C. directly through a second reduction zone to reduce the tantalum pentachloride to a tantalum material selected from the group consisting of metallic tantalum and tantalum hydride and to precipitate such tantalum material.

9. In a process of producing a tantalum material selected from the group consisting of metallic tantalum and tantalum hydride, the steps which comprise passing a mixture containing tantalum pentachloride and niobium pentachloride in a flow of dry hydrogen through a ceramic tube, the first part of said tube being provided with Raschig rings as contact-surface increasing bodies, said first part of the tube forming the first reduction zone, the mixture of tantalum pentachloride and niobium pentachloride in said flow of dry hydrogen, on passing through said first reduction zone, being heated to a temperature between about 400° C. and about 800° C. and the niobium pentachloride present in said mixture being reduced to niobium trichloride, said niobium trichloride being precipitated in said first reduction zone, passing the resulting gaseous mixture of unreduced tantalum pentachloride, hydrogen, and hydrogen chloride through the second part of said tube being provided with tantalum foil as contact-surface increasing bodies, said second part of the tube forming the second reduction zone, the mixture of unreduced tantalum pentachloride, hydrogen, and hydrogen chloride, on passing through said second reduction zone, being heated to a temperature between about 1000° C. and about 1300° C. and the tantalum pentachloride present in said mixture being reduced to a tantalum material selected from the group consisting of metallic tantalum and tantalum hydride, said tantalum material being precipitated in said second reduction zone.

References Cited in the file of this patent

UNITED STATES PATENTS

| | | |
|---|---|---|
| 1,289,079 | Balke | Dec. 31, 1918 |
| 2,242,759 | Schlecht et al. | May 20, 1941 |
| 2,429,671 | Cuvelliez | Oct. 28, 1947 |
| 2,443,254 | Kroll | June 15, 1948 |
| 2,452,665 | Kroll | Nov. 2, 1948 |
| 2,516,863 | Gardner | Aug. 1, 1950 |

FOREIGN PATENTS

| | | |
|---|---|---|
| 646,375 | Great Britain | Nov. 22, 1950 |